United States Patent [19]

Phillips

[11] 3,961,538
[45] June 8, 1976

[54] EXPANSIBLE SHEET METAL PULLEY WITH MANNUAL DETENT ADJUSTMENT MEANS

[75] Inventor: Ronald L. Phillips, Orchard Lake, Mich.

[73] Assignee: General Motors Corporation, Detroit, Mich.

[22] Filed: Sept. 23, 1974

[21] Appl. No.: 508,537

[52] U.S. Cl. .......................... 74/230.8; 74/230.17 B
[51] Int. Cl.² .................... F16H 55/52; F16H 55/54
[58] Field of Search............ 74/230.01, 230.3, 230.8, 74/230.11, 230.13, 230.14, 230.16, 230.17 B, 230.17 C, 230.17 D, 230.17 P

[56] References Cited
UNITED STATES PATENTS

| | | | |
|---|---|---|---|
| 1,952,884 | 3/1934 | Nichols et al...................... | 74/230.3 |
| 2,896,461 | 7/1959 | Grevich......................... | 74/230.17 C |
| 3,200,661 | 8/1965 | Chambers.................... | 74/230.17 C |

*Primary Examiner*—Samuel Scott
*Assistant Examiner*—A. Russell Burke
*Attorney, Agent, or Firm*—Charles R. Engle

[57] ABSTRACT

An adjustable pulley of the split-sheave type is formed of stamped sheet metal and is retained assembled by a Belleville spring engaging deformations on one sheave part and a tang struck from the other sheave part. One sheave part has a plurality of cam seats facing a mating portion on the other sheave part, the latter having a plurality of cam surfaces of varying heights thereon. The cam surfaces are deformed areas projecting a predetermined distance toward the cam seats. Rotation of one sheave part to position particular cam surfaces upon the cam seats places the sheaves a predetermined axial distance apart establishing a predetermined effective belt groove width permitting use of various belts.

3 Claims, 6 Drawing Figures

U.S. Patent  June 8, 1976  3,961,538
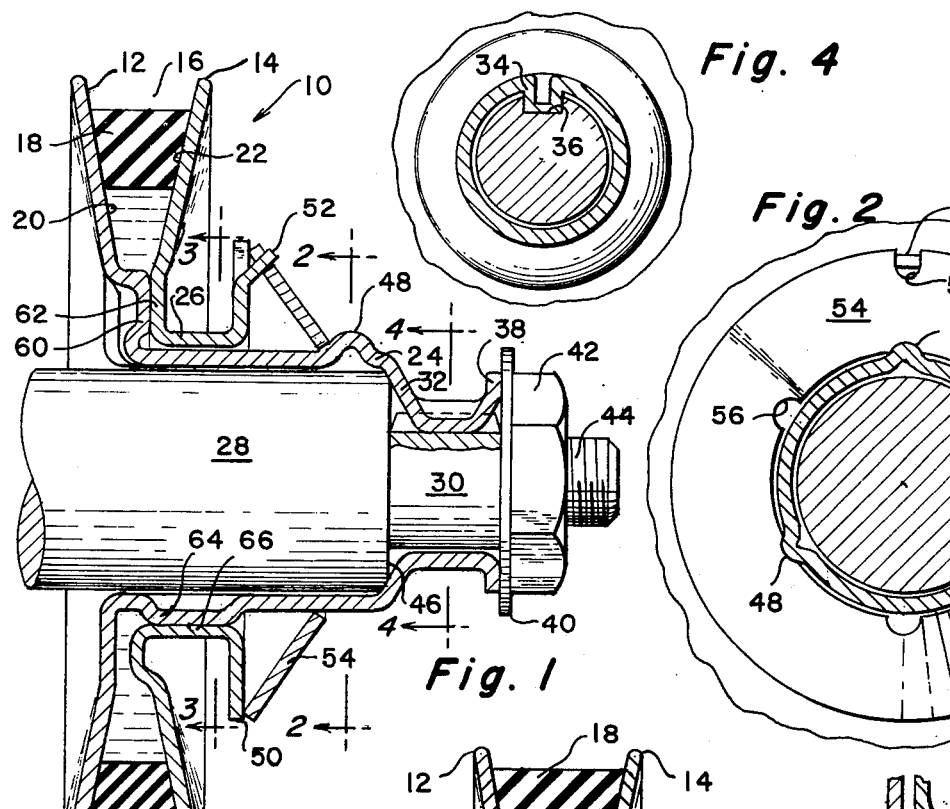
Fig. 1
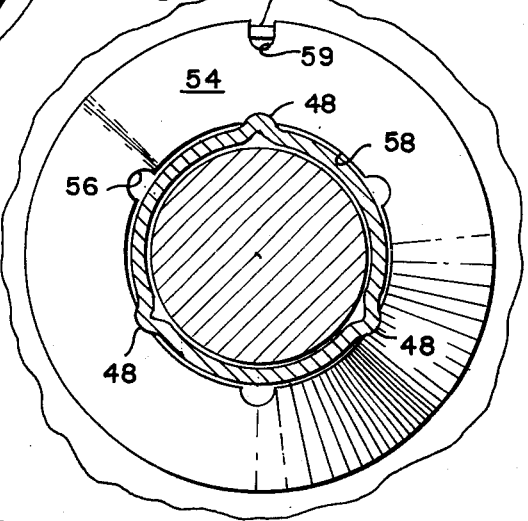
Fig. 4
Fig. 2
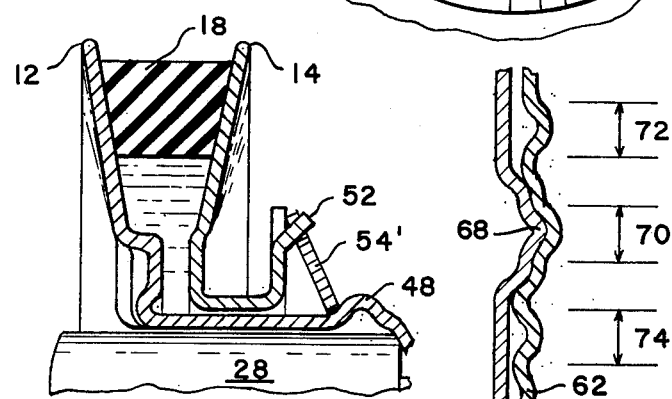
Fig. 6
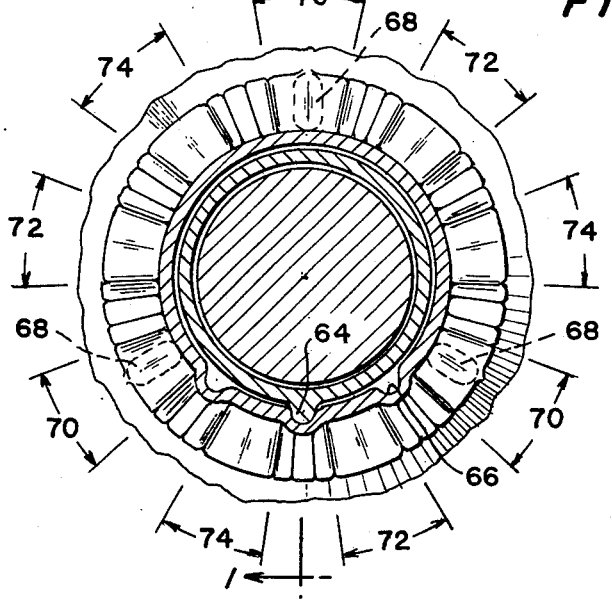
Fig. 3
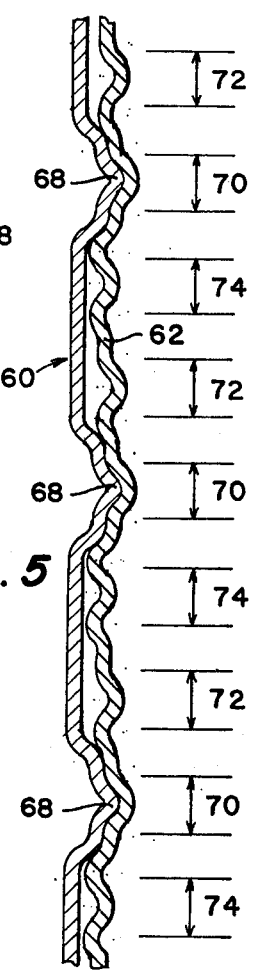
Fig. 5

EXPANSIBLE SHEET METAL PULLEY WITH MANNUAL DETENT ADJUSTMENT MEANS

This invention relates to an improved adjustable pulley of the type shown in my copending application Ser. No. 422,698 filed Dec. 7, 1973 now U.S. Pat. No. 3,910,129 and entitled "Adjustable Pulley". More specifically, this invention relates to an adjustable pulley of the split-sheave type wherein the sheaves are formed from stamped sheet metal material and can be rotated to specifically space the sheaves relative to each other varying the effective belt groove width of the pulley assembly.

Split pulley structures, presently known in the art, include a considerable number of separate components and usually require use of final assembly forming operations to lock the components assembled. These known structures also require separate components to provide the necessary driving connections between split pulley sheave halves and an associated shaft. Further, when the pulley assembly is of the split sheave type and does incorporate means for adjusting the distance between the sheaves, the assembly usually includes a relatively complex mechanism in order to accomplish the adjustment.

These disadvantages are overcome by the structure of the present invention in that the pulley sheave halves are composed of stamped sheet metal including integral axially extending hubs having engaging driving and adjusting means. The fixed pulley sheave half and hub includes two spline portions, one engaging with a spline groove in a supporting shaft drivingly connecting the fixed sheave half and its integral hub to the shaft while the other spline portion engages a mating portion on a reciprocable sheave half hub drivingly connecting the sheave halves for rotation as a unit. The fixed hub is deformed including three equiangularly circumferentially spaced projecting spring seats engaging aligned notches in an inner circumferential surface of a Belleville spring permitting assembly of the spring onto the fixed hub. The spring seats pass through the notches in the spring as it is moved axially over the hub into an assembled position. After the Belleville spring is axially positioned on the fixed hub and rotated moving the notches out of alignment with the spring seats, the Belleville spring is then depressed engaging a tang struck from a radial flange of the reciprocable hub in a notch in the outer periphery of the Belleville spring. Upon release of the spring its inherent force frictionally locks the spring assembled to the pulley. The slight amount of spring force applied against the struck out tang retains the pulley completely assembled in a manner permitting the reciprocable hub to move axially relative to the fixed hub as the axially extending mating splined portions have sufficient length for providing such movement while maintaining the driving connection therebetween.

Use of endless belts to transmit power from one source to another frequently results in incorporation of an idler pulley having an adjustable pivot point thereby being effective to remove any excess slack that may develop in the belt system. The slack in the system can result from manufacturing tolerances in the actual fabricating of the belt or can result from elongation of the belt after a period of years. The adjustable pulley structure of the present invention accommodates these variances in belt length by the spring characteristics of the Belleville spring. In the event the belt is not of a precise desired length, the split pulley sheave halves of the subject invention are moved closer together by the spring increasing the effective pulley diameter or they are moved further apart by the belt tension against the spring force reducing the effective pulley diameter. Obviously this structure eliminates the necessity of providing a fixed idler pulley to provide a desired tension in the endless belt for proper operation in transmitting power from one source to another. Since endless belts used in power transmitting mechanisms are not of uniform width, it is not uncommon to have a belt with a width different from that of the pulleys used in the system. The pulley structure of my invention is adjustable accommodating belts of at least three widths. The sheave halves are provided with cam seats and cam sets on mating surfaces so that one sheave half can be rotated relative to the other engaging a particular cam set with the cam seats providing a predetermined width in the pulley belt groove. Wider adjustment between the sheave halves can be obtained by using a Belleville spring of a narrow width permitting greater movement of the movable sheave half relative to the fixed sheave half. This adjustment of the width of the belt groove can also be used to vary the effective pulley diameter when a belt of a particular width is used in the driving system.

Accordingly, a prime object of the present invention is a provision of an adjustable pulley assembly including split-sheave halves formed of stamped sheet metal resulting in an economical reliable and simply constructed pulley assembly.

Another object of the present invention is the provision of fixed and reciprocable pulley sheave halves having integral hubs coaxially positioned upon a shaft in driving engagement therewith, the reciprocable sheave half being biased by a Belleville spring toward the fixed sheave half forming a belt groove therebetween, the effective width of the belt groove being adjustable by rotation of the reciprocable sheave half relative to the fixed sheave half.

A further object of the present invention is the provision of a stamped sheet metal pulley assembly including a fixed pulley sheave half and a reciprocable pulley sheave half each having integral hubs coaxially disposed upon a shaft and being in driving engagement with one another as well as the shaft so that the sheave halves rotate as a pulley assembly, the fixed pulley sheave half having a plurality of cam seats thereon, and the reciprocable pulley sheave half having a plurality of cam sets thereon so that alignment of a respective cam set with the cam seats spaces the sheave halves a predetermined distance apart establishing a belt groove having an effective belt width or an effective diameter.

The novel features which I believe to be characteristic of my invention are set forth with particularity in the appended claims. My invention itself, however, both as to its organization and method of operation, may be best understood by reference to the following description taken in conjunction with the accompanying drawings in which:

FIG. 1 is a longitudinal cross-sectional view of a pulley constructed in accordance with my invention;

FIG. 2 is a fragmentary cross-sectional view taken on line 2—2 of FIG. 1;

FIG. 3 is a fragmentary cross-sectional view taken on line 3—3 of FIG. 1;

FIG. 4 is a fragmentary cross-sectional view taken on line 4—4 of FIG. 1;

FIG. 5 is an unfolded geometrically developed view of the cam seats and cam sets of my invention illustrated in FIG. 3; and FIG. 6 is a fragmentary cross-sectional view of a pulley of my invention using a Belleville spring of a reduced width.

Referring now to FIG. 1, the adjustable pulley assembly 10 of my invention includes split or separate fixed and reciprocable pulley sheave halves 12 and 14 respectively cooperating to form a belt groove 16 receiving an endless belt 18. In a preferred form, the sheave halves 12 and 14 include tapered surfaces 20 and 22 so as to accommodate the endless belt 18 in the form of a V-belt.

The fixed sheave half 12 and the reciprocable sheave half 14 are both preferably formed of stamped sheet metal and include integral hubs 24 and 26 respectively which are coaxially positioned upon a shaft 28. The shaft 28 has an end portion 30 of reduced diameter which receives a necked down portion 32 of integral hub 24 so that an internally extending lug 34, best shown in FIG. 4, struck from the necked down portion 32 engages a groove 36 in the shaft portion 30 providing a driving connection between the shaft and the integral hub 24. The necked down portion 32 of the fixed integral hub 24 terminates in a radially extending flange 38 which is engaged by a washer 40 retained by a nut 42 threadably engaging a threaded portion 44 of the shaft 28. The integral hub 24 and its associated sheave half 12 are fixedly mounted upon the shaft 28 as the necked down portion 32 is secured against face 46 of the shaft.

The integral hub 24 of fixed sheave half 12 also includes three upstanding spring seats 48 which are in the form of deformed areas at three equiangularly spaced points circumferentially about the hub 24. The integral hub 26 of sheave half 14 terminates in a radially extending flange 50 which has a tang 52 struck from its outer peripheral surface for a purpose to be later described. A Belleville spring 54 has three equiangularly spaced notches 56 formed in its inner peripheral surface 58, as best shown in FIG. 2, the notches being configured to receive the spring seats 48 on hub 24 permitting assembly of the spring upon the hub 24 when the notches 56 are aligned with the seats 48. After Belleville spring 54 is positioned upon the hub 24 and is moved past the spring seats 48 with the notches 56 in alignment therewith the spring 54 is rotated to position a locking notch 59 in alignment with the aforementioned tang 52 struck from flange 50 of hub 26. The spring is then slightly depressed to permit engagement of the locking notch 59 with the tang 52 and upon release the spring force is effective to maintain the pulley 10 assembled.

The force of spring 54 constantly biases the reciprocable sheave half 14 toward fixed sheave half 12 and consequently maintains surface 60 of sheave half 12 in engagement with surface 62 of sheave half 14. The integral hub 24 of sheave half 12 includes a spline tooth 64 engaging a mating groove 66 formed in integral hub 26 providing a driving connection between the integral hubs for rotation with the shaft 28 via the driving engagement of lug 34 in shaft groove 36.

With reference now to FIG. 3, the surfaces 60 and 62 of the fixed sheave half 12 and the reciprocable sheave half 14 respectively are shown overlying one another for purposes of illustrating means by which my invention permits adjustment of the width of belt groove 16 or the effective pulley diameter as the case may be. The surface 60 of sheave half 12 has three equiangularly spaced cam seats 68 formed thereon. The cam seats 68 are provided by deforming the surface 60 at the three equiangularly spaced points. The surface 62 on the other hand is deformed to include a plurality of cam sets. For purposes of illustration, the surface 62 is shown as including three separate cam sets wherein positioning of the respective sets into engagement with the aforementioned cam seats 68 precisely positions the surface 62 a predetermined distance from the surface 60. The sheave half 14 can be rotated against the force of Belleville spring 54 to engage a particular cam set with the cam seat 68. Belleville spring 54 will of course rotate with the sheave half 14 by virtue of engagement of tang 52 and locking notch 59 and will remain effective to continually bias the sheave half 14 toward the fixed sheave half 12 as long as the spring notches 56 remain out of alignment with spring seats 48. Of course this fact can be contemplated when the cam surfaces are formed upon the surface 62 of sheave half 14. A spline groove 66 for each cam set can be provided in hub 26 so that the hubs 24 and 26 remain drivingly connected when the sheave half 14 is rotated to change a cam selection.

Referring now to FIG. 5, the sets of cams are best illustrated in a schematic view of the developed surfaces 60 and 62. Three cam sets 70, 72 and 74, each of which includes three cams for engagement with the three cam seats 68 are shown. The cam set including cams 70 permit the surfaces 60 and 62 to be in close proximity to one another thereby adjusting the width of belt groove 16 to a minimum. The intermediate cams 72 move the reciprocable sheave half 14 a specified distance further to the right in FIG. 1 against the force of Belleville spring 54 so as to permit accommodation of a wider V-belt 18. The usual adjustment in such an arrangement would be one-eighth of an inch. As an example, if the cams 70 permit use of a belt one-half inch wide then rotation of sheave half 14 engaging cams 72 with cam seat 68 would permit use of a V-belt having a width of five-eighths of an inch.

The cam set including cams 74 when positioned in engagement with cam seats 68 move the reciprocable sheave half 14 further away from the fixed sheave half 12 so that the belt groove is of a wider dimension to accommodate a belt having a greater width, for instance in accordance with the aforementioned example its width would be three-fourths inches. Since the V-belts normally do come in one-eighth inch increments this degree of adjustment by the cam sets 70, 72 and 74 is illustrative of an operational configuration. Of course, the cams 70, 72 and 74 can be configured to provide any range of dimensions desired as long as the spring 54 can accommodate the relative movements of hubs 24 and 26. If necessary, a new spring 54 having a width correlated to the amount of adjustment can be placed upon the spring seats 48 permitting the desired adjustment established by the particular cam set as illustrated in FIG. 6 wherein a relatively narrow spring 54 is used. As previously mentioned, the dimensions of the cams 70, 72 and 74 can be such to accommodate a predetermined variance in the length of the endless belts 18. The prime function of the cams however in accordance with my invention is to permit utilization of belts of varying width.

In operation, with the reciprocable sheave half 14 rotated to engage a particular set of cams with the cam seats establishing a specific belt groove width, the spring 54 continually urges the reciprocable sheave half 14 toward and into engagement with the fixed sheave half 12. This spring force is effective to accommodate a limited amount of variance in the length of the endless belts due to manufacturing tolerances. If the belt is initially somewhat tight the sheave halves may be forced slightly apart until it stretches and then reengage their mating surfaces 60 and 62. More specifically, the radial position of the belt 18 within the belt groove 16 is adjusted automatically by the force of the spring 54 in accordance with the length of the belt and the applied driving force as limited by engagement of the cams with the cam seats.

While I have shown and described a particular embodiment of my invention, it will, of course, be understood that various modifications and alternative constructions thereof may be made without departing from the true spirit and scope of my invention and that I intend by the appended claims to cover all such modifications and alternative constructions as fall within the true spirit and scope of my invention.

I claim:

1. An adjustable pulley of the split sheave type of sheet metal construction wherein a movable sheave half is adjustably positioned relative to a fixed sheave half providing a variable width belt groove therebetween, the adjustable pulley comprising in combination; a fixed sheave half, a first hub fixed to said fixed sheave half, a shaft, said first hub positioned on said shaft, means drivingly connecting said first hub to said shaft, a movable sheave half, a second hub secured to said movable sheave half, said movable sheave half mounted for axial reciprocating movement relative to said fixed sheave half, means drivingly connecting said fixed and movable sheave halves for rotation in unison as a pulley assembly, spring means mounted on said first hub engaging said second hub continuously biasing said movable sheave half toward said fixed sheave half while maintaining the sheave halves assembled, cam means in the form of deformations having varying heights on one of said sheave halves, and cam seats in the form of deformations on the other of said sheave halves, said cam means selectively engaging said cam seats when said movable sheave half is rotated against the biasing force of said spring means, engagement of particular cam means with said cam seats establishing a predetermined axial distance between said sheave halves and a predetermined width in said belt groove.

2. An adjustable pulley of stamped sheet metal construction and of the split sheave type having a variable effective belt groove width for drivingly engaging a V-belt comprising in combination; a shaft, a fixed sheave half and integral hub of stamped sheet metal construction positioned upon and secured to said shaft for rotation therewith, said shaft containing a spline groove, said integral hub including a depressed internally extending male spline mating with said shaft groove providing said driving connection therebetween, a movable sheave half and integral hub of stamped sheet metal construction coaxially positioned upon said fixed hub for axial reciprocable movement relative to said fixed hub, said fixed and reciprocable hubs each having a splined portion in mating engagement drivingly connecting them for rotation in unison, said fixed hub having three equiangularly spaced projections extending radially outwardly therefrom, a Belleville spring, said spring having three equiangularly spaced notches in its internal circumferential surface, said spring being coaxially positioned upon said fixed hub by said notches receiving the three equiangularly spaced projections permitting axial movement of said spring past said projections, a radially extending flange on said reciprocable hub, a locking tang struck from the outer periphery of said radially extending flange, said Belleville spring containing a locking notch whereby rotation of said spring aligning said tang with said notch after said spring is moved onto said fixed hub positions said spring notches out of alignment with said hub projections seating said spring against said projections, said tang engaging said spring notch when said spring is slightly depressed and the subsequent release thereof applying a spring force against said hub projections while said tang positively retains the pulley assembled, three equiangularly circumferentially spaced cam seats on said fixed sheave half facing toward said fixed hub, and three equiangularly circumferentially spaced cam sets on said movable sheave half facing said fixed sheave half, each cam set comprising three equiangularly spaced cams whereby each cam set includes individual cams having a predetermined height for engagement with said cam seats so that when said reciprocable sheave half is rotated to engage a particular cam set with said cam seats a predetermined axial distance is provided between said fixed sheave half and said reciprocable sheave half establishing a predetermined effective width in said belt groove.

3. An adjustable pulley of the split sheave type and formed from stamped sheet metal wherein a movable sheave half is adjustably positioned relative to a fixed sheave providing a variable effective belt groove width accommodating a plurality of belts, the adjustable pulley comprising in combination; a fixed sheave half, a first hub, a shaft, said first hub being integral with said fixed sheave half and being positioned on said shaft, means drivingly connecting said first hub to said shaft, a movable sheave half, a second hub, said second hub being integral with said movable sheave half and reciprocally movable relative to said fixed sheave half, means drivingly connecting said fixed and movable sheave halves for rotation in unison as a pulley assembly, spring means mounted on said first hub engaging said second hub continuously biasing said movable sheave half toward said fixed sheave half while maintaining the sheave halves assembled, a plurality of cam seats in the form of deformations on said fixed sheave half projecting outwardly toward said movable sheave half, and a plurality of cam sets in the form of deformations formed on said movable sheave half projecting outwardly toward said cam seats, said cam sets being arranged whereby a plurality of equal height cams in each set engage said cam seats when the movable sheave half is rotated against the biasing force of said spring means to a particular position relative to said fixed sheave half establishing a predetermined axial distance between said sheave halves thereby defining a predetermined effective belt groove width for acceptance of a specific endless belt.

* * * * *